(12) United States Patent
Farmer

(10) Patent No.: US 8,778,546 B2
(45) Date of Patent: Jul. 15, 2014

(54) AIR BREATHING LITHIUM POWER CELLS

(75) Inventor: Joseph C. Farmer, Tracy, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 784 days.

(21) Appl. No.: 12/778,967

(22) Filed: May 12, 2010

(65) Prior Publication Data

US 2010/0291443 A1    Nov. 18, 2010

Related U.S. Application Data

(60) Provisional application No. 61/177,517, filed on May 12, 2009.

(51) Int. Cl.
| | |
|---|---|
| *H01M 8/22* | (2006.01) |
| *H01M 4/134* | (2010.01) |
| *H01M 4/90* | (2006.01) |
| *H01M 4/133* | (2010.01) |
| *H01M 12/08* | (2006.01) |

(52) U.S. Cl.
CPC ............. *H01M 12/08* (2013.01); *Y02E 60/128* (2013.01); *Y02E 60/50* (2013.01); *H01M 2300/0077* (2013.01); *H01M 4/134* (2013.01); *H01M 2300/0048* (2013.01); *H01M 2300/0091* (2013.01); *H01M 4/90* (2013.01); *H01M 4/133* (2013.01); *Y02E 60/122* (2013.01)
USPC .......................................... 429/403; 429/402

(58) Field of Classification Search
USPC ........................................................ 429/304
See application file for complete search history.

(56) References Cited

U.S. PATENT DOCUMENTS

| | | | |
|---|---|---|---|
| 5,605,550 A | 2/1997 | Jensen et al. | |
| 7,449,033 B2 | 11/2008 | Ward et al. | 29/623.3 |
| 2004/0161667 A1 | 8/2004 | Fukuzawa et al. | |
| 2005/0026037 A1 | 2/2005 | Riley, Jr. et al. | |
| 2005/0170255 A1 | 8/2005 | Koh et al. | |
| 2008/0286649 A1* | 11/2008 | Li et al. | 429/188 |
| 2009/0239132 A1* | 9/2009 | Johnson | 429/61 |
| 2009/0246636 A1 | 10/2009 | Chiang et al. | |
| 2010/0075225 A1 | 3/2010 | Wilkins et al. | |
| 2010/0291443 A1* | 11/2010 | Farmer | 429/304 |

OTHER PUBLICATIONS

Fey et al. ("Thermal and electrochemical behavior of yttria-stabilized zirconia coated LiCoO2 during overcharge tests" Journal of power sources vol. 189, Issue 1, Apr. 2009, pp. 837-840).*
Restriction Requirement from U.S. Appl. No. 12/778,978 dated Jan. 12, 2012.
U.S. Appl. No. 12/778,975, filed May 12, 2010.
U.S. Appl. No. 12/778,978, filed May 12, 2010.
Non-Final Office Action Summary from U.S. Appl. No. 12/778,978 dated Mar. 26, 2012.

(Continued)

*Primary Examiner* — Ula C Ruddock
*Assistant Examiner* — Jacob Marks
(74) *Attorney, Agent, or Firm* — Dominic M. Kotab

(57) ABSTRACT

A cell suitable for use in a battery according to one embodiment includes a catalytic oxygen cathode; a stabilized zirconia electrolyte for selective oxygen anion transport; a molten salt electrolyte; and a lithium-based anode. A cell suitable for use in a battery according to another embodiment includes a catalytic oxygen cathode; an electrolyte; a membrane selective to molecular oxygen; and a lithium-based anode.

20 Claims, 7 Drawing Sheets

(56) References Cited

OTHER PUBLICATIONS

Restriction/Election Requirement from U.S. Appl. No. 12/778,975 dated Sep. 19, 2012.

Final Office Action from U.S. Appl. No. 12/1778,978 dated Sep. 19, 2012.

Non-Final Office Action from U.S. Appl. 12/778,975 dated Nov. 2, 2012.

\* cited by examiner

AIR BREATHING LITHIUM POWER CELLS

RELATED APPLICATIONS

This application claims priority to provisional U.S. Appl. No. 61/177,517 filed on May 12, 2009, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to energy production, and more particularly, to systems and methods for producing energy with air breathing lithium power cells.

BACKGROUND

Electrochemical energy storage is currently used in many different portable applications, such as wireless communications and portable computing, just to name a few, and will be essential for the realization of future fleets of electric and hybrid electric vehicles, which are now believed to be an essential part of the world's strategy for reducing our dependence on oil and minimizing the impact of gaseous emissions of CO and $CO_2$ on climate change. In looking at possible materials that can be used for anodes in electrochemical energy conversion and storage systems, hydrogen and lithium are two of the lightest elements and have the highest specific capacities, usually given in units of Ah/kg. See FIG. 1 which is a plot showing rankings of conventional anode materials. Hydrogen is typically used to power fuel cells, while lithium is typically used in advanced rechargeable battery cells and batteries.

Most currently used energy storage systems use lithium-ion battery chemistry, with graphite anodes that intercalate lithium upon charging, mixed transition metal oxide cathodes that intercalate lithium during discharge, a micro-porous polyethylene electrode separator, and an electrolyte formed from a dielectric mixed-solvent composed of organic carbonates, with an appropriate dissolved high-mobility lithium salt. The movement of the lithium ions between the intercalation anodes and cathodes during charging and discharging is commonly known as the "rocking chair" mechanism.

Cells with liquid electrolytes are usually housed in cylindrical or prismatic metal cans, with stack pressure maintained by the walls of the can, while cells with polymer gel electrolytes are usually housed in soft-sided aluminum-laminate packages, with stack pressure achieved through thermal lamination of the electrodes and separators, thereby forming a monolithic structure.

The coating of active material on the copper anode foil includes graphite powder with a conductive carbon filler and a polyvinyldine fluoride (PVDF) binder, while the coating of active material on the aluminum cathode foil includes a transition metal oxide powder, also with a conductive carbon filler and a PVDF binder. Both natural and manmade graphite, such as mesocarbon microbeads (MCMB), have been used for the anodes, while $Li_xCoO_2$, $Li_xNiO_2$, $Li_xMn_2O_4$, mixed transition metal oxides with cobalt, nickel, and manganese, and iron-phosphates, among others, are common choices for the cathode.

Over the past decade, these systems have attained outstanding specific energy and energy density, exceptional cycle life and rate capabilities that enable them to now be considered for both vehicular and power tool applications, in addition to their early applications in wireless communications and portable computing. The best commercially available, polymer-gel lithium ion battery now has a specific energy of greater than 180 Wh/kg, an energy density of greater than 360 Wh/L, and a reasonably good rate capability, allowing discharge at C/2.

The specific energy is calculated by dividing the total energy stored in the lithium-ion cell by the total mass of material involved in the cell construction, while the energy density is calculated by dividing the total energy stored in the lithium-ion (or other) cell by the total volume of material involved in the cell construction. The cell mass includes those materials used for fabrication of the graphite intercalation anodes, transition metal oxide intercalation cathodes, separators, and cell packaging.

For example, both liquid prismatic and polymer gel cells may be incorporated into large high-capacity power packs and used to power large energy users, such as large mobile lasers. Such high capacity systems have state-of-the-art computerized charge and discharge control which includes graphical user interfaces, sensing for monitoring the health of individual cells, and charge balancing networks. Such lithium ion batteries, which rely on the rocking chair mechanism, are generally believed to be safer than those where lithium exists in the reduced metallic state.

The use of flammable completely liquid-phase and polymer-gel electrolytes with a substantial fraction of liquid electrolyte, coupled with a high energy density, a relatively delicate (about 20 micron thick) polymeric separator, and the possibility of lithium plating and dendrite formation due to non-uniform stack pressure and electrode misalignment, as well as sharp edges on electrode foils and foreign objects and debris trapped between the electrodes, have led to catastrophic internal shorts, followed by the onset of thermal runaway, electrolyte combustion, and other serious safety problems associated with these energy storage systems. One example of the type of unanticipated event with a lithium ion battery is evidenced by the rash of exploding laptop batteries experienced several years ago. The possibility of such an event occurring on commercial airliners, where many passengers carry laptop computers and cell phones with such batteries, is especially disconcerting. These events have occurred on much larger scales, and have caused industry-wide concern in the continued use of this important technology.

In conventional lithium-ion cells, thermal runaway can lead to disproportionation of the transition metal oxide cathode, thereby liberating sufficient oxygen inside of the closed cell volume to support oxidation of the organic carbonate solvents used in the liquid or polymer-gel electrolytes. Therefore, it would be very beneficial to develop new battery materials that enhance the performance of rechargeable solid-state lithium-ion batteries, and that will provide high specific energy, high volumetric energy density, and high rate capability at high and/or low temperatures, e.g., about 0° C., with substantially improved safety and reliability.

SUMMARY

A cell suitable for use in a battery according to one embodiment includes a catalytic oxygen cathode; a stabilized zirconia electrolyte for selective oxygen anion transport; a molten salt electrolyte; and a lithium-based anode.

A cell suitable for use in a battery according to another embodiment includes a catalytic oxygen cathode; an electrolyte; a membrane selective to molecular oxygen; and a lithium-based anode.

Other aspects and embodiments of the present invention will become apparent from the following detailed description, which, when taken in conjunction with the drawings, illustrate by way of example the principles of the invention.

DETAILED DESCRIPTION

Figure 1:
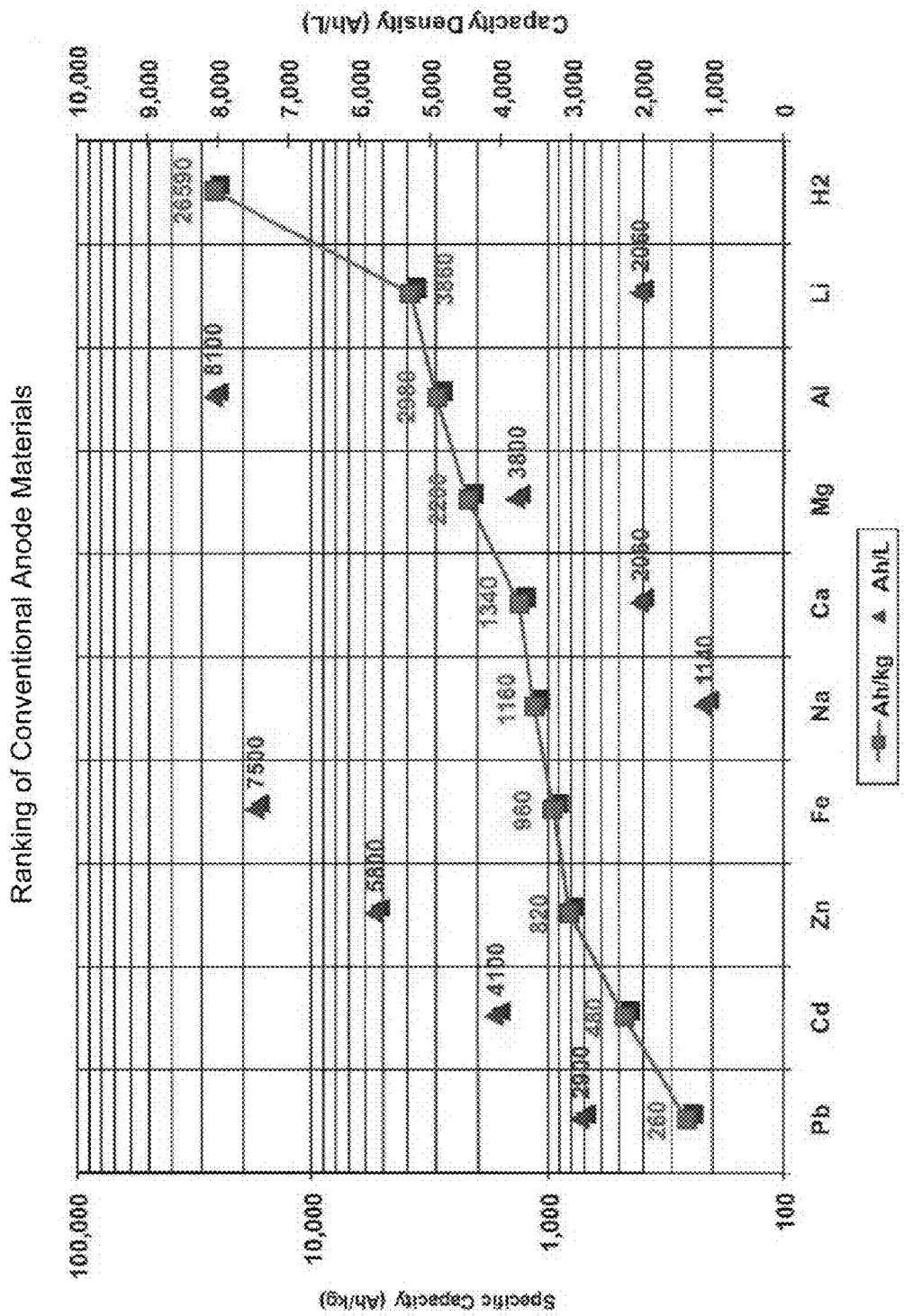
FIG. 1 is a plot showing a ranking of conventional anode materials that can be used in primary or rechargeable batteries formed with multilayer coating techniques.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Disclosed herein are new air breathing lithium cells. One set of embodiments is directed to cells operating at a relatively high temperature. Another set of embodiments is directed to cells operating at a relatively low temperature. Each type of cell may be used alone or in combination with the same or different types of cells.

According to some embodiments, a plurality of air-breathing lithium batteries or cells may be used. One or more of the cells may operate at a relatively high temperature, while one or more cells may operate at a relatively low temperature. In one preferred embodiment, pairs of air-breathing lithium cells may be used, one at a high temperature and one at a low temperature. In this way, multiples of two cells may be used to provide as much energy as desired. In the case of an air-breathing lithium-metal or a lithium-ion battery, the specific energy is increased dramatically by decreasing the overall cell weight by replacing the transition metal oxide cathode with an air breathing cathode. Instead of carrying the weight of the cathodic reactant as payload, the cell extracts the cathodic reactant (oxygen) from the atmosphere, thereby eliminating this weight. In addition to using lithium-metal and intercalated-graphite as the anode material, solid hydrides can be used, as well as other alkali metals, including sodium, potassium, and the low-melting sodium-potassium eutectic, provided that a sufficiently high integrity separator is used. Also, by replacing the cathodic reactant normally used in cells with air, the rate of catastrophic reaction during internal shorting may be limited, and the associated safety problems described in the Background section mitigated. The rate of combustion may also be limited by the availability of oxygen from the atmosphere, which could be controlled and limited in the event of a battery short and an ensuing fire.

It is also possible to completely eliminate the use of combustible liquid-phase electrolytes through the use of solid-state fast ion conductors, in one approach, including in some embodiments, an air-breathing lithium-metal and lithium-ion battery.

In one embodiment, a high temperature cell may include: a catalytic oxygen cathode formed from a porous carbon such as a carbon aerogel, a yttria-stabilized zirconia electrolyte for selective oxygen anion transport into the cell, a molten salt electrolyte with very high lithium solubility, a lithium-based anode (which can be formed from metallic lithium, lithium alloys such as lithium-silicon and lithium-tin, and graphite intercalated with lithium, and other lithium-based materials). Some benefits of the high temperature cell include overcoming the solubility limit of lithium in other liquid electrolytes, eliminating lithium-nickel-cobalt oxide from the cathode, eliminating lithium-iron-phosphate from the cathode, the ability to accommodate relatively fast charging and discharging rates (high rate capability).

In another embodiment, a low temperature cell may include a catalytic oxygen cathode including porous carbon and carbon aerogels, a membrane selective to molecular oxygen which prevents the passage of organic solvents from any liquid electrolyte, the ability to accommodate either solid or liquid electrolytes, a lithium-based anode (which can include a lithium metal, graphite intercalated with lithium, and various lithium alloys such as lithium-silicon, lithium-tin, etc.). Some benefits of the low temperature cell include eliminating transition metal oxides from the oxygen cathode, and high rate capability.

Figure 2:
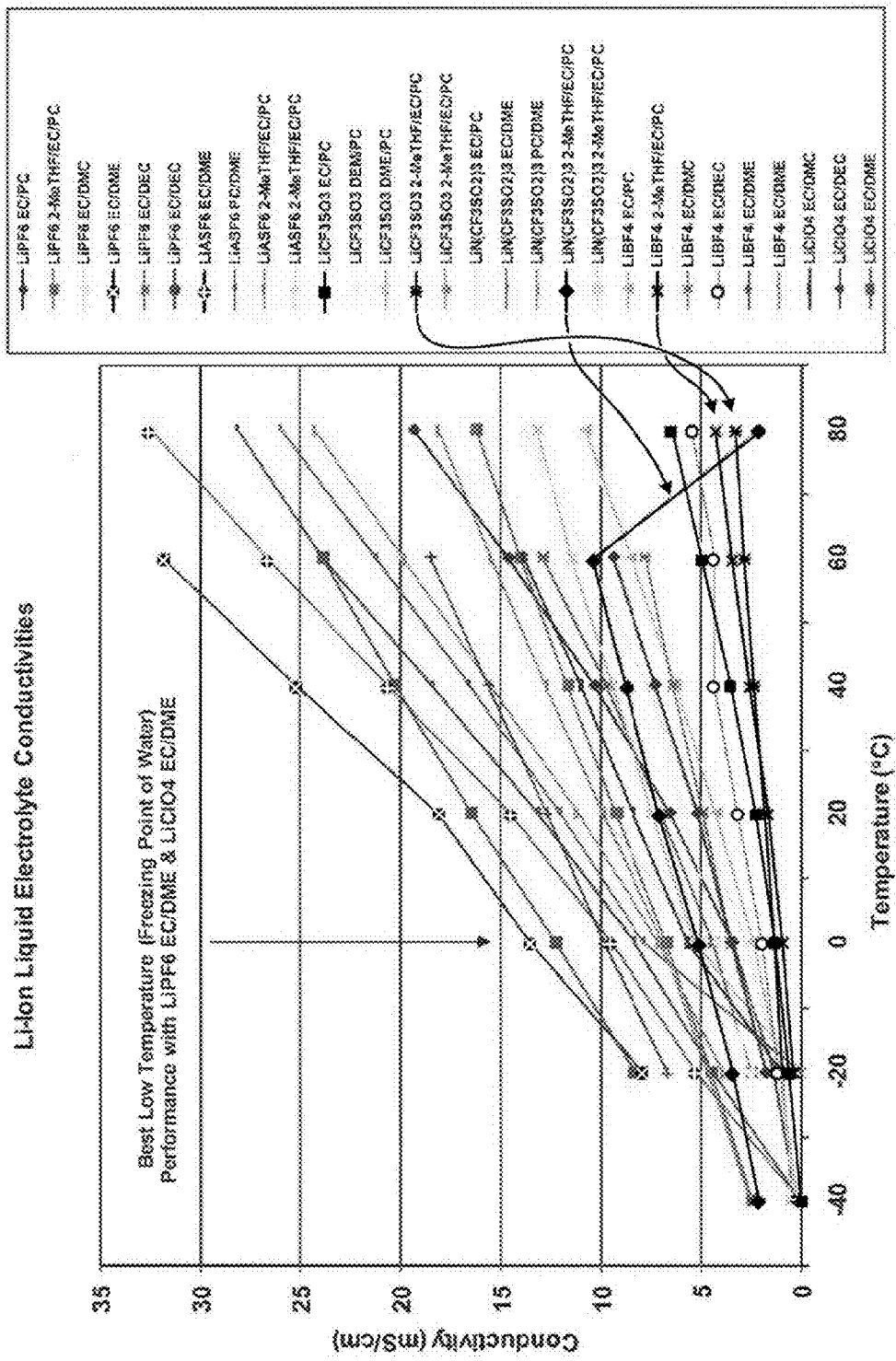
FIG. 2 shows a plot of Li-ion liquid electrolyte conductivities, that establish targeted conductivities for electrolyte coatings used in some embodiments.

Solid-state electrolyte systems with exceptionally high mobility, according to one embodiment, may be developed that are mechanically robust, thermochemically stabile, and inherently safe. These new electrolytes may involve organic solid-polymer electrolytes, and may enable the construction of cells with an electrolyte/separator thickness of preferably less than about 25 microns, and electrolyte conductivity preferably greater than about 15 mS/cm at 0° C. This level of lithium ion mobility in a solid material is greater than that observed with the best liquid electrolytes, some of which are shown in FIG. 2. The best currently available materials have an order-of-magnitude lower conductivity, and lack stability in contact with the cathode, which exists at a high anodic (oxidizing) potential. These advanced solid-state high-mobility ion conductor materials may enable the construction of inherently safe, high-rate, high-capacity solid-state lithium cells, in some preferred embodiments. Substitution, inorganic constituents, and/or radiation cross-linking may be employed, as desired.

These new solid-state fast ion conductors may serve not only as solid-state electrolytes, but also as binders for the active materials used for holding the anode and cathode materials to their respective current collectors. In one embodiment, by incorporating hard powders of inorganic ion-conductive materials into the polymeric material, a robust composite separator material may be formed between the two electrodes, with enhanced mobility and resistance to shorting. A graded composite is possible, where inorganic particles in the polymer matrix transition from transition metal oxides at the cathode interface, to ion-conductive particles in the separator region, to graphitic particles at the anode interface, according to preferred approaches.

Advanced anode materials, according to some embodiments, may be developed to provide a specific capacity of about 750 Ah/kg, and a capacity density of about 1700 Ah/L, in some approaches, which exceeds the performance of currently available and known materials. For comparison purposes, intercalated graphite ($Li_xC_6$) is the industry standard for the active material used to fabricate anodes in lithium-ion battery cells, and has a theoretical specific capacity of 372 Ah/kg, and a theoretical capacity density of 837 Ah/L, (the practical values are lower than these theoretical values). The advanced anode materials, in some embodiments, exceed the theoretical values for the industry standard materials by a factor of at least two.

Advanced cathode materials, according to some embodiments, may be developed to provide a specific capacity of up to about 550 Ah/kg, and a capacity density of up to about 2040 Ah/L. For comparison purposes, lithium cobalt oxide ($Li_xCoO_2$) is the industry standard for the active material used to fabricate cathodes in lithium-ion battery cells, and has a theoretical specific capacity of 274 Ah/kg, and a theoretical capacity density of 1017 Ah/L (the practical values are lower than these theoretical values). The advanced cathode materials, in some approaches, exceed the theoretical values for the industry standard materials, once again, by a factor of two.

In addition to conventional electrode materials, novel materials and structures have been explored. Explored materials include: Si and $CoO_2$ nanowires; titanates; nano-structural metal foam electrodes with electrodeposited or sputtered lithium, and ion conductive polymer infiltration; and non-stoichiometric oxide fillers with metal-like electrical conduction. These solid state ion-conductive materials may be designed with the help of models founded in statistical mechanics and molecular dynamics. The attributes of the molecular structure that impact ion mobility include: (1) the specific cation exchange group substituted onto the polymer backbone, (2) the distance between adjacent cation exchange groups, (3) the impact of other substituent groups on ion mobility, (4) the impact of cross-linking, and (5) the effects of temperature and potential. The thermochemical stability of solid electrolyte systems using these materials may be explored with differential scanning calorimetry, as well as with computational codes such as THERMOCALC.

Ultimately, an inherently safe, high-energy, high-rate solid-state rechargeable battery may be fabricated as a composite solid-state material, in some approaches. Advancements made through material science enables the construction of a solid-state rechargeable battery that may have a specific capacity of at least about 360 Ah/kg and a volumetric capacity density of at least about 700 Ah/L. The best currently commercially available lithium ion battery now has a specific energy of about 180 Wh/kg, an energy density of about 350 Wh/L, and a reasonably good rate capability, allowing discharge at C/2. A typical solid polymer electrolyte (SPE) cell has a specific energy of only about 100 Wh/kg, and an energy density of only about 80 Wh/L (though some higher values have been reported). These advancements allow for the first robust solid-state rechargeable battery to be brought to market.

In addition to the solid state electrolytes described above, other well known solid state electrolytes may be used, and some are shown in Table 1, below.

TABLE 1

Examples of Solid State Electrolytes

| Dates | Electrolyte | σ (S m$^{-1}$) | Cell System | Capacity Density (Ah/L) | Energy Density (Wh/L) |
|---|---|---|---|---|---|
| 1950-1960 | AgI | $10^{-3}$ | Ag/$V_2O_5$ | | |
| 1960-1965 | $Ag_3SI$ | 1 | Ag/$I_2$ | 750 | 510 |
| 1965-1972 | $RbAg_4I_5$ | 30 | Ag/$Me_4NI_5$ | | |
| 1965-1975 | β-$(Al_2O_3)_{11}(Na_2O)_1$ | 3 | Na—Hg/$I_2$(PC) | 540 | 1600 |
| 1970-1975 | LiI($Al_2O_3$) | $10^{-3}$ | Li/$PbI_2$ | | |
| 1970-1980 | LiI | $10^{-5}$ | Li/$I_2$(P2VP) | 690 | 1900 |
| 1978-1985 | LiX-PEO | $10^{-5}$ | Li/$V_2O_5$ | | |
| 1980-1986 | $Li_{0.36}I_{0.14}O_{0.007}P_{0.11}S_{0.38}$ | $5 \times 10^{-2}$ | Li/$TiS_2$ | | |
| 1983-1987 | MEEP | $10^{-2}$ | Li/$TiS_2$ | | |
| 1985-1992 | Plasticized SPE | $10^{-1}$ | Li/$V_6O_{13}$ | | |
| 1985-1992 | $Li_{0.35}I_{0.12}O_{0.31}P_{0.12}S_{0.098}$ | $2 \times 10^{-3}$ | Li/$TiS_2$ | | |
| 1990-1992 | $Li_{0.39}N_{0.02}O_{0.47}P_{0.12}$ | $3 \times 10^{-4}$ | Li/$V_2O_5$ | | |

Figure 3:
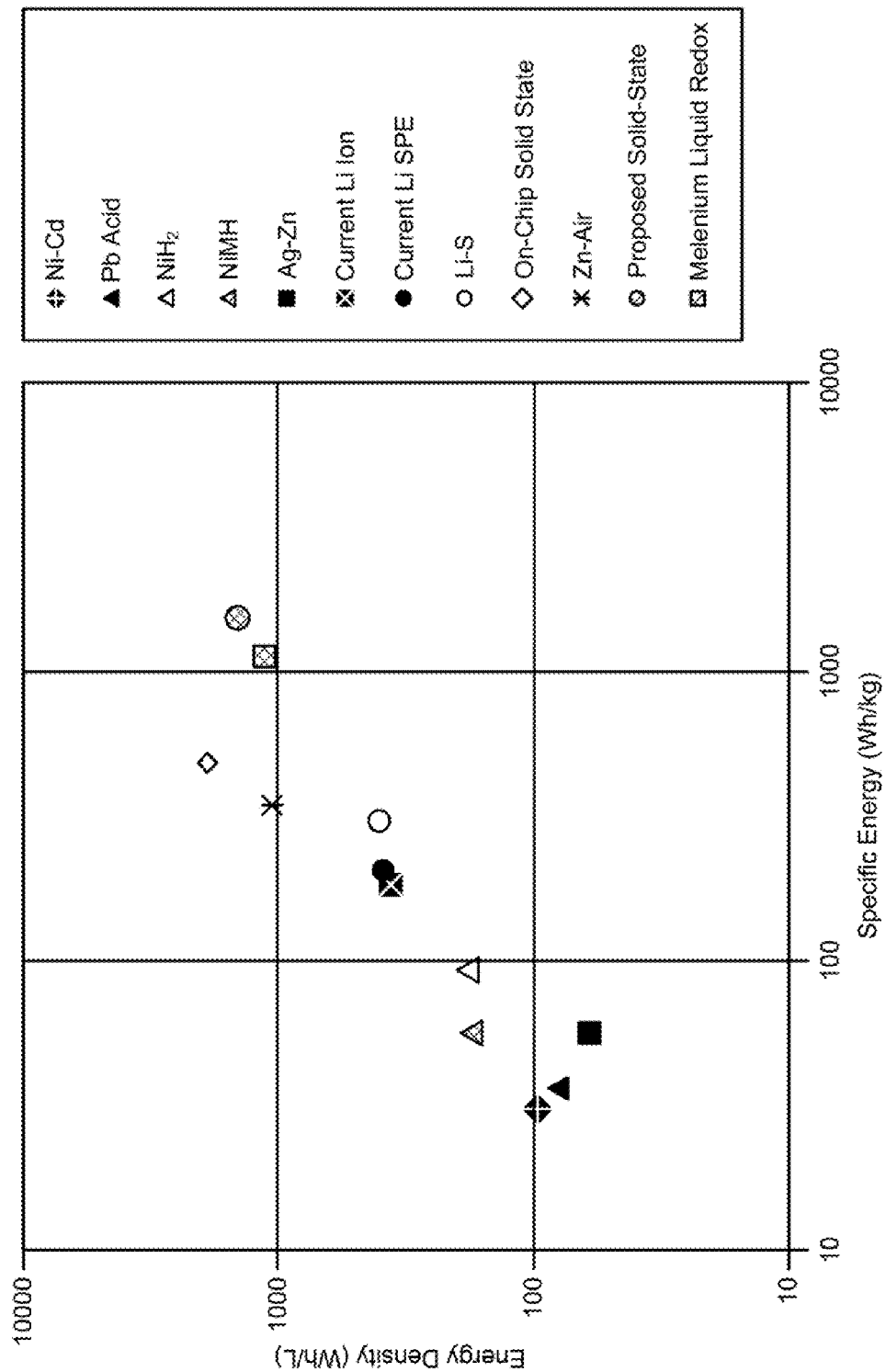
FIG. 3 shows a plot comparing the specific energies and energy densities of various energy storage technologies.

Several illustrative possibilities are summarized in FIG. 3, which is a comparison plot of energy storage technologies. The plot clearly shows that the cells and batteries disclosed herein, according to multiple embodiments, provide the highest combination of specific energy and energy density, as desired by the field.

Figure 4:
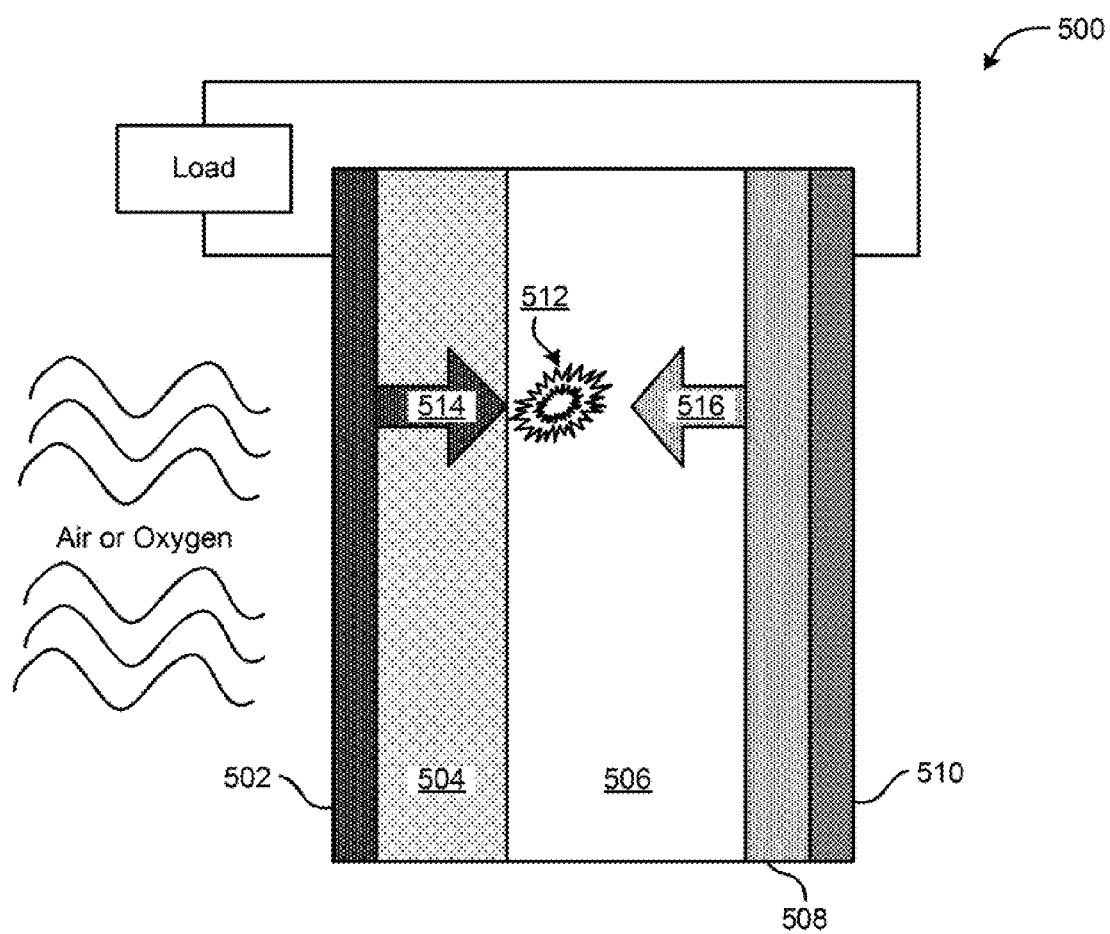
FIG. 4 shows a simplified schematic diagram of an air-breathing cell with an air-breathing cathode fabricated on solid-state YSZ, a lithium-metal anode, and a molten salt located between the YSZ and the lithium-metal anode, according to one embodiment.

As shown in FIG. 4, according to one embodiment, a cell 500 suitable for use in a battery, and preferably a high temperature cell, includes a catalytic oxygen cathode 502, a stabilized zirconia electrolyte 504 for selective oxygen anion transport, a molten salt electrolyte 506, and a lithium-based anode 508. In some embodiments, the cell 500 may also include an anode plate 510.

In some approaches, the cathode 502 may include a Group 3 to Group 12 metal, e.g., transition metals, noble metals, etc. These metals provide a proper basis for the reaction sequence to produce a lithium oxide formation 512 in the molten salt electrolyte 506 and selective transport of oxygen anions as indicated by arrow 514.

In more approaches, the cathode 502 may include a ceramic and a catalyst comprising a Group 10 metal. In even more approaches, the cathode 502 may include a porous carbon, a porous carbon aerogel substrate, or some other material.

In even more approaches, the zirconia electrolyte 504 may be stabilized with yttria, such as a selective yttria-stabilized zirconia electrolyte for oxygen anion transport.

In some embodiments, the lithium-based anode 508 may be constructed of a material selected from a group consisting of: metallic lithium (e.g., Li—Si, Li—Pb, Li-graphite, etc.), a lithium alloy, etc. These materials provide a proper basis for dissolution and liquid phase transport of the lithium cations, as indicated in FIG. 4 by arrow 516.

According to some preferred embodiments, the cathode 502 does not include substantial amounts of lithium-nickel-cobalt and/or lithium-iron-phosphate, as these materials are not as effective as others discussed herein.

Some of the advantages of the high temperature cell 500 include overcoming the solubility limit of lithium in other liquid electrolytes, eliminating the need for lithium nickel-cobalt oxide in the cathode, eliminating the need for lithium-iron-phosphate active material in the cathode, and fast charging and discharging (e.g., a high rate capability), among other advantages.

Figure 7:
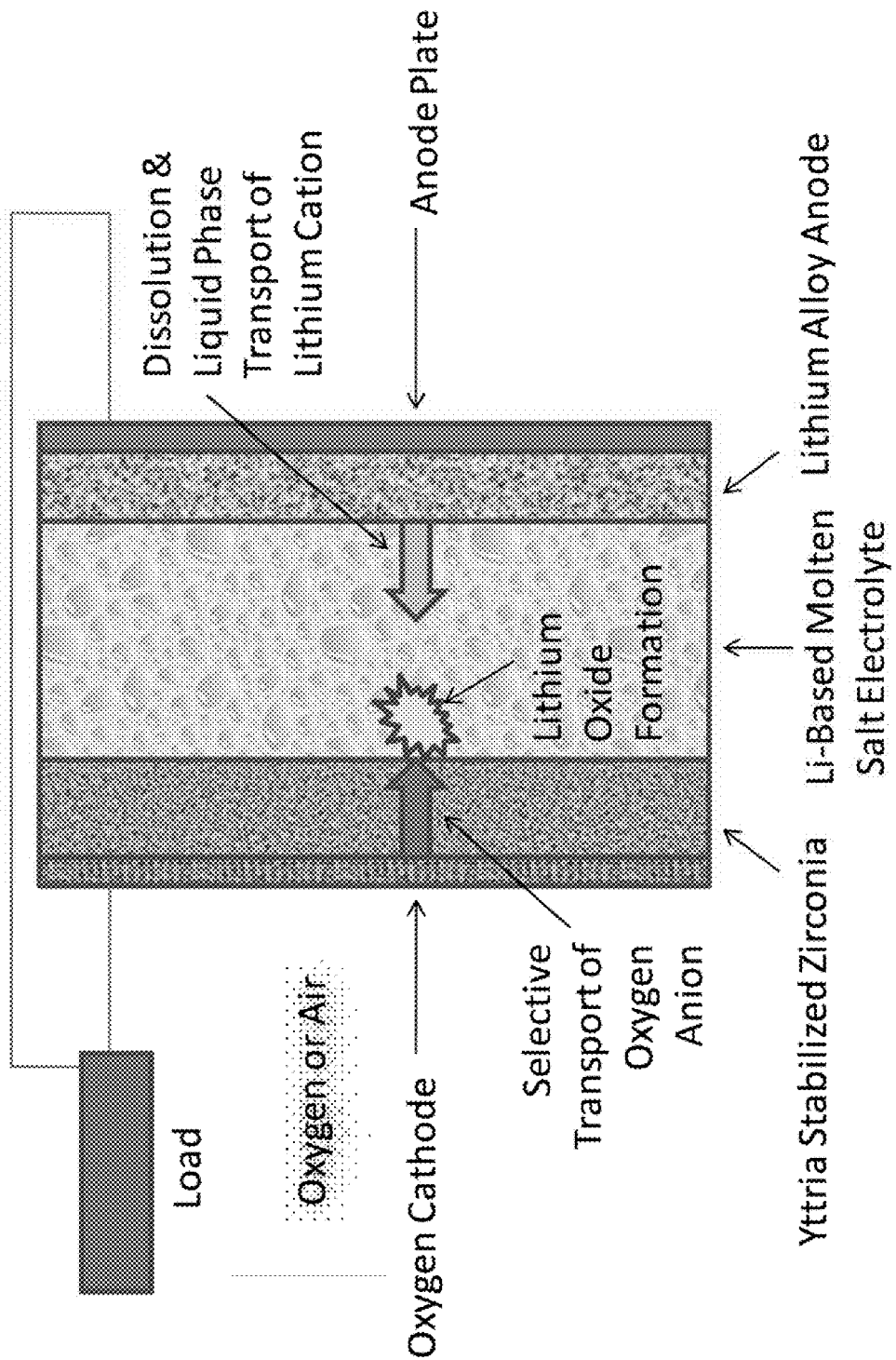
FIG. 7 shows a simplified schematic diagram of a high-temperature air-breathing sodium-beta battery, in one embodiment.

In one example, as shown in FIG. 7, if operated at a higher temperature, an air-breathing air cathode may be fabricated by metalizing one side of a solid-state fast oxygen-anion conductor, such as yttria-stabilized zirconia or YSZ ($Y_2O_3$—$ZrO_2$). Behind this solid-state electrolyte-separator, a molten salt may be used as a high-temperature electrolyte, providing a medium into which the lithium can be dissolved from the lithium-metal or lithium-intercalation anode. In a slightly different design, an additional solid-state lithium ion conductor may be used between the YSZ and a molten lithium-metal alloy anode. This higher temperature cell may also include a liquid-phase sodium or sodium-alloy anode, a $\beta''$-$Al_2O_3$ sodium ion conducting separator, a molten salt compartment for the formation of NaCl reaction product, a YSZ oxygen ion conducting separator, and an air-breathing cathode.

Figure 5:
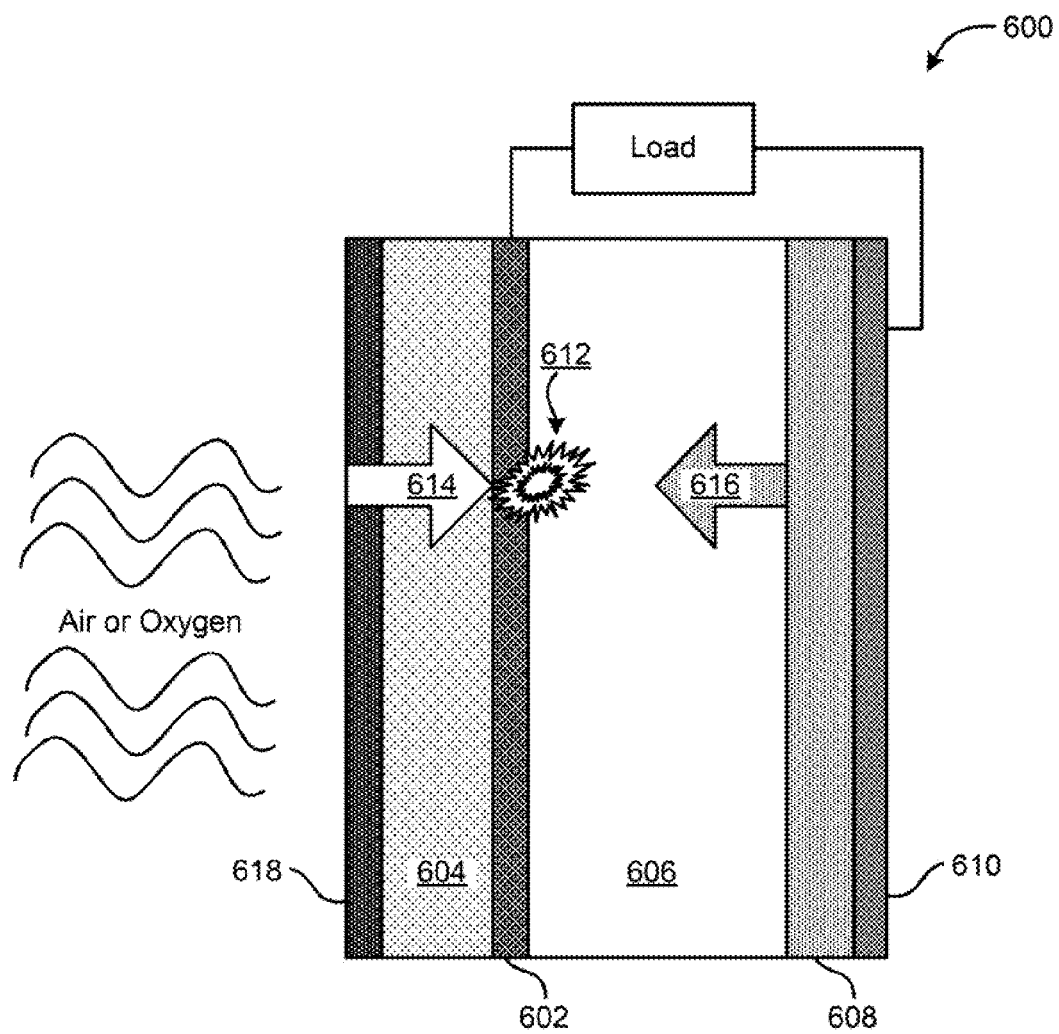
FIG. 5 shows a simplified schematic diagram of an air-breathing cell with a lithium-intercalation anode, according to one embodiment.

Now referring to FIG. 5, a cell 600 suitable for use in a battery is shown according to one embodiment. The cell 600 may preferably be a lower temperature cell. The cell 600 includes a catalytic oxygen cathode 602, an electrolyte 606, a membrane selective to molecular oxygen 604, and a lithium-based anode 608. In some embodiments, the cell 600 may also include an anode plate 610 and/or a cathode plate 618.

According to some approaches, the cathode 602 may include a porous carbon. In more approaches, the cathode 602 may include a carbon aerogel. Either of these materials, alone or in combination, provide a proper basis for the reaction sequence to form a lithium oxide 612 in the electrolyte 606 and selective transport of oxygen anions as indicated by arrow 614.

In one embodiment, the lithium-based anode 608 may be constructed of a material selected from a group consisting of: metallic lithium, a lithium alloy, and lithium-graphite. These materials provide a proper basis for dissolution and liquid phase transport of the lithium cations, as indicated in FIG. 5 by arrow 616.

In a preferred embodiment, the electrolyte 606 may be a liquid electrolyte. In further embodiments, the membrane 604 may prevent passage of organic solvents from the liquid electrolyte 606.

In another approach, the electrolyte 606 is a solid electrolyte. In these approaches, the solid electrolyte 606 may couple at least one of the anode 608 and the cathode 602 to an underlying conductor. In some embodiments, a composition of the solid electrolyte 606 may change across a cross section thereof from an end thereof closest to the anode 608 to an end thereof closest to the cathode 602. Further, in some approaches, the solid electrolyte 606 may have a graded composition across the cross section thereof, wherein inorganic particles in the solid electrolyte 606 transition from primarily transition metal oxides near the end closes to the cathode 602, to ion conductive particles in a separator region, to graphitic particles near the end closest to the anode 608.

According to some preferred embodiments, the cathode 602 does not include a transition metal oxide, for reasons discussed herein.

According to one approach, a conductivity of the electrolyte 606 may be greater than 15 milliSiemens per centimeter (mS/cm) at 0° C. In this approach, the electrolyte 606 may be a solid electrolyte.

Some advantages of the low temperature cell 600 include eliminating the need for lithium-nickel-cobalt-oxide in the cathode, eliminating the need for lithium-iron-phosphate in the cathode, and fast charging and discharging (e.g., a high rate capability), among other advantages.

Figure 6:
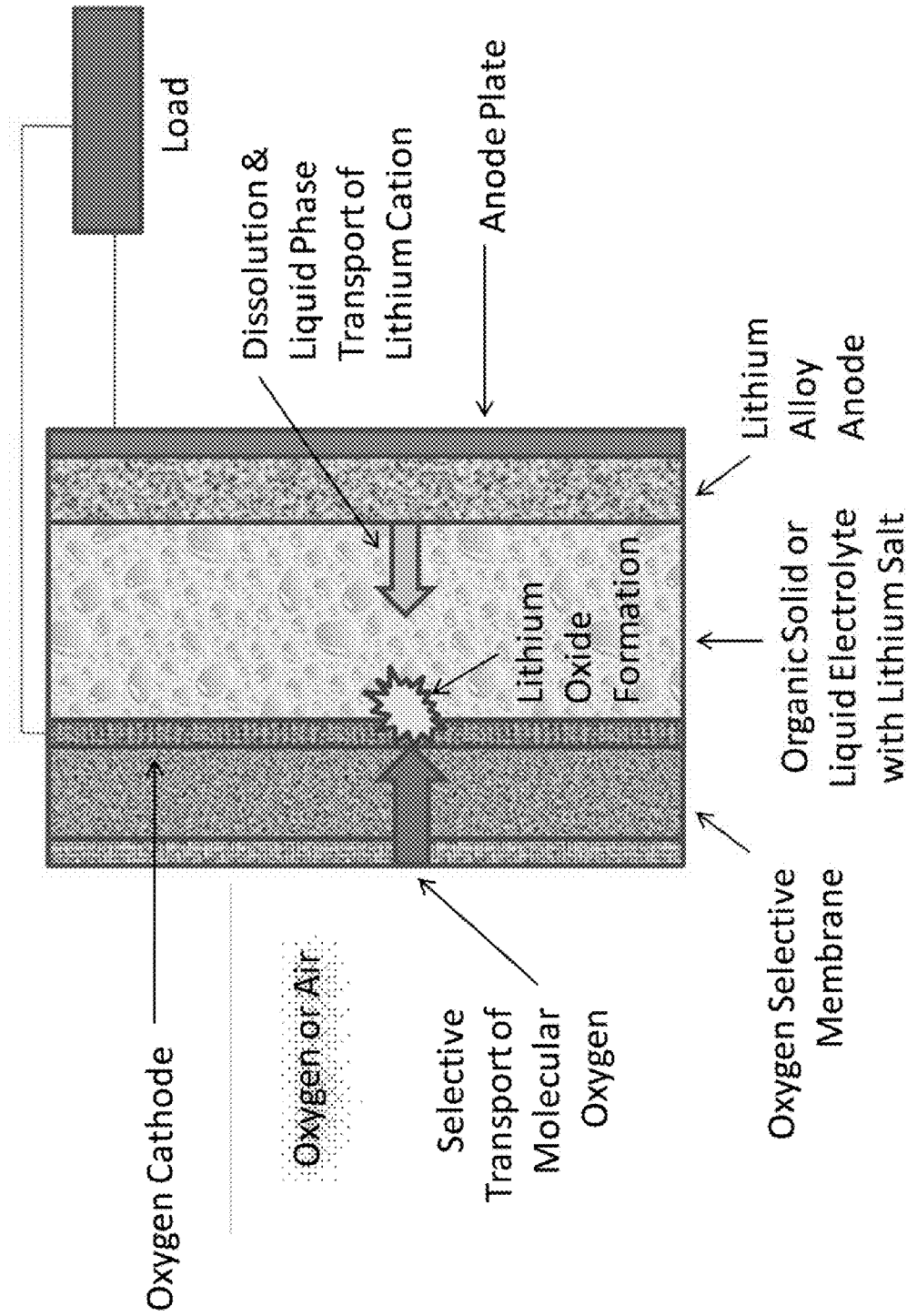
FIG. 6 shows a simplified schematic of a low-temperature version of an air-breathing cell, according to one embodiment.

A low-temperature version of the cell is also possible, as shown in FIG. 6, according to one embodiment, with a catalytic oxygen cathode, including porous carbon and carbon aerogels, a membrane selective to molecular oxygen that prevents passage of organic solvents from any liquid electrolyte and has the ability to accommodate either solid or liquid electrolytes, a lithium-based anode including lithium metal and/or graphite intercalated with lithium, and various lithium alloys such as lithium-silicon, lithium-tin, etc. Specific benefits of the low temperature cell include eliminating the use of transition metal oxides with the oxygen cathode and high rate capability.

Analogous configurations exist, according to other embodiments, including substituting sodium, potassium, and/or a low-melting sodium-potassium eutectic mixture for the lithium. In this particular case, an air-breathing cathode may be formed by depositing a porous electrocatalytic layer and current collector on the front (air) side of the YSZ, with a molten chloride salt on the opposite side. Then, a fast sodium-ion conductor such as $\beta''$-$Al_2O_3$ may be placed between the liquid-phase sodium or sodium alloy anode, with a molten chloride salt including NaCl as a constituent between the $\beta''$-$Al_2O_3$ and the YSZ. The overall cell configuration may be represented as Na-M-Alloy/$\beta''$-$Al_2O_3$/Na-M-Cl/YSZ/Air, in one embodiment.

Ultimately, air-breathing lithium-metal and lithium-ion cells may be used in a wide variety of applications, similar to those where lithium-ion cells are currently being used, with great savings of weight and enhanced duration with battery packs of equivalent sizes, according to various embodiments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A cell suitable for use in a battery, the cell comprising:
   a stabilized zirconia electrolyte separator for selective oxygen anion transport;
   a catalytic oxygen cathode coating one side of the stabilized zirconia electrolite separator;
   a lithium-based anode; and
   a lithium-based molten salt electrolyte positioned between the stabilized zirconia electrolyte and the lithium-based anode.

2. The cell of claim 1, further comprising a solid-state lithium ion conductor positioned between the stabilized zirconia electrolyte separator and the lithium-based anode, wherein the lithium-based anode comprises a molten lithium-metal alloy.

3. The cell of claim 1, wherein the cathode includes a ceramic and a catalyst comprising a Group 10 metal and provides a specific capacity of at least about 500 Ah/kg and capacity density of at least about 1900 Ah/L.

4. The cell of claim 1, wherein the stabilized zirconia electrolyte is stabilized with yttria.

5. The cell of claim 1, wherein the lithium-based anode provides a specific capacity of at least about 750 Ah/kg and a capacity density of at least about 1700 Ah/L, and is constructed of a material selected from a group consisting of metallic lithium, a lithium alloy, and lithium-graphite.

6. The cell of claim 1, with the proviso that the cathode does not include lithium-nickel-cobalt oxide and lithium-iron-phosphate.

7. A cell suitable for use in a battery, the cell comprising:
a catalytic oxygen cathode;
a lithium-based anode;
a solid-phase ion-conductive electrolyte comprising inorganic particles, wherein a conductivity of the solid-phase ion-conductive electrolyte is greater than 15 milliSiemens per centimeter (mS/cm) at 0° C.; and
a membrane selective to molecular oxygen positioned on a side of the cathode exposed to an oxygen source, the membrane being configured to accommodate either solid or liquid electrolytes.

8. The cell of claim 7, wherein the cathode includes a porous carbon, and wherein the solid electrolyte has a composition that changes across a cross section thereof from an end thereof closest to the anode to an end thereof closest to the cathode.

9. The cell of claim 7, wherein the cathode includes a carbon aerogel.

10. The cell of claim 7, wherein the lithium-based anode is constructed of a material selected from a group consisting of metallic lithium, a lithium alloy, and lithium-graphite.

11. The cell of claim 7, wherein a specific capacity of the cell is greater than about 360 Ah/kg, and wherein a capacity density of the cell is greater than about 700 Ah/L.

12. The cell of claim 7, wherein a specific capacity of the cell is greater than about 360 Ah/kg, and wherein a capacity density of the cell is greater than about 700 Ah/L.

13. The cell of claim 7, wherein the solid electrolyte couples at least one of the anode and the cathode to an underlying conductor.

14. The cell of claim 7, wherein the anode comprises graphite intercalated with lithium.

15. The cell of claim 7, wherein the solid electrolyte has a graded composition across the cross section thereof, wherein inorganic particles in the solid electrolyte transition from primarily transition metal oxides near the end thereof closest to the cathode, to ion conductive particles in a separator region, to graphitic particles near the end thereof closest to the anode.

16. The cell of claim 7, with the proviso that the cathode does not include a transition metal oxide.

17. A cell suitable for use in a battery, the cell comprising:
a catalytic oxygen cathode;
an electrolyte;
a membrane selective to molecular oxygen; and
a lithium-based anode;
wherein a conductivity of the electrolyte is greater than 15 milliSiemens per centimeter (mS/cm) at 0° C.

18. The cell of claim 17, wherein the electrolyte is a solid electrolyte that has a composition that changes across a cross section thereof from an end thereof closest to the low-temperature lithium-based anode to an end thereof closest to the low-temperature catalytic oxygen cathode.

19. The cell of claim 17, wherein the electrolyte is an organic solid-polymer electrolyte.

20. The cell of claim 7, wherein the solid electrolyte is an organic solid-polymer electrolyte.

* * * * *